US012615123B2

(12) United States Patent
Zhou et al.

(10) Patent No.: US 12,615,123 B2
(45) Date of Patent: Apr. 28, 2026

(54) DATA PROCESSING METHOD AND APPARATUS, NETWORK DEVICE, STORAGE MEDIUM AND PROGRAM PRODUCT

(71) Applicant: DATANG MOBILE COMMUNICATIONS EQUIPMENT CO., LTD., Beijing (CN)

(72) Inventors: Ye Zhou, Beijing (CN); Aijuan Liu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 301 days.

(21) Appl. No.: 18/553,541

(22) PCT Filed: Apr. 6, 2022

(86) PCT No.: PCT/CN2022/085365
§ 371 (c)(1),
(2) Date: Sep. 29, 2023

(87) PCT Pub. No.: WO2022/213999
PCT Pub. Date: Oct. 13, 2022

(65) Prior Publication Data
US 2024/0195578 A1     Jun. 13, 2024

(30) Foreign Application Priority Data

Apr. 7, 2021    (CN) .......................... 202110373435.0

(51) Int. Cl.
H04W 72/23        (2023.01)
H04L 5/00          (2006.01)
*H04W 92/04*         (2009.01)

(52) U.S. Cl.
CPC ........... *H04L 5/0053* (2013.01); *H04W 72/23* (2023.01); *H04W 92/04* (2013.01)

(58) Field of Classification Search
CPC ........... H04W 72/232; H04W 72/0446; H04W 72/11; H04W 72/1284; H04W 76/28;
(Continued)

(56) References Cited

U.S. PATENT DOCUMENTS

| | | | | |
|---|---|---|---|---|
| 2021/0168779 A1* | 6/2021 | Mondal | ................. | H04L 5/0053 |
| 2023/0164861 A1* | 5/2023 | Wang | .................... | H04W 76/15 |
| | | | | 370/328 |
| 2023/0380003 A1* | 11/2023 | Agiwal | ................. | H04W 72/21 |

FOREIGN PATENT DOCUMENTS

| | | |
|---|---|---|
| CN | 108430077 A | 8/2018 |
| CN | 109392023 A | 2/2019 |

(Continued)

OTHER PUBLICATIONS

The State Intellectual Property Office of the People's Republic of China, the Second Office Action in Application No. 202110373435. 0, Mar. 30, 2024, 12 pages.

(Continued)

*Primary Examiner* — Wei Zhao
(74) *Attorney, Agent, or Firm* — KILPATRICK TOWNSEND & STOCKTON LLP

(57)                    ABSTRACT

A data processing method and apparatus, a network device, a storage medium and a program product. The method is applied to a first network element in a radio access network, and includes: receiving a downlink data packet, where the downlink data packet includes downlink user data and an identifier of a data flow to which the downlink user data belongs; and transmitting a first interface message to a second network element in the radio access network, where the first interface message includes the identifier of the data
(Continued)

flow, and the first interface message is used for determining a target bearer to which the data flow is mapped.

13 Claims, 4 Drawing Sheets

(58) Field of Classification Search
CPC ... H04W 92/04; H04W 72/23; H04W 72/044; H04W 72/128; H04W 52/021; H04L 5/0053
See application file for complete search history.

(56) References Cited

FOREIGN PATENT DOCUMENTS

| | | | |
|---|---|---|---|
| CN | 110312282 | A | 10/2019 |
| CN | 111629450 | A | 9/2020 |
| EP | 3836612 | A1 | 6/2021 |
| WO | 2020119546 | A1 | 6/2020 |

OTHER PUBLICATIONS

ISA State Intellectual Property Office of the People's Republic of China, International Search Report and Written Opinion Issued in Application No. PCT/CN2022/085365, Jun. 22, 2022, WIPO, 11 pages.
LG Electronics Inc et al., "Bearer Context Modification Required procedure",3GPP TSG-RAN WG3 #100, Busan, South Korea, May 21-25, 2018, total 5 pages,R3-182844.
Samsung et al., "Correction of intra-system HO in CP-UP separation scenario", 3GPP TSG-RAN WG3 #111-e, Jan. 25-Feb. 4, 2021, total 11 pages, R3-211260.
InterDigital Communications, "MAC Layer Impact of Supporting Different Services", 3GPP TSG-RAN WG2 #96, Reno, Nevada Nov. 14-18, 2016, total 4 pages, R2-168468.
State Intellectual Property Office of the People's Republic of China, Office Action Issued in Application No. 2021103734350, Jun. 21, 2023, 9 pages.
European Patent Office, Extended European Search Report Issued in Application No. 22784065.9, Aug. 2, 2024, Germany, 10 pages.

* cited by examiner

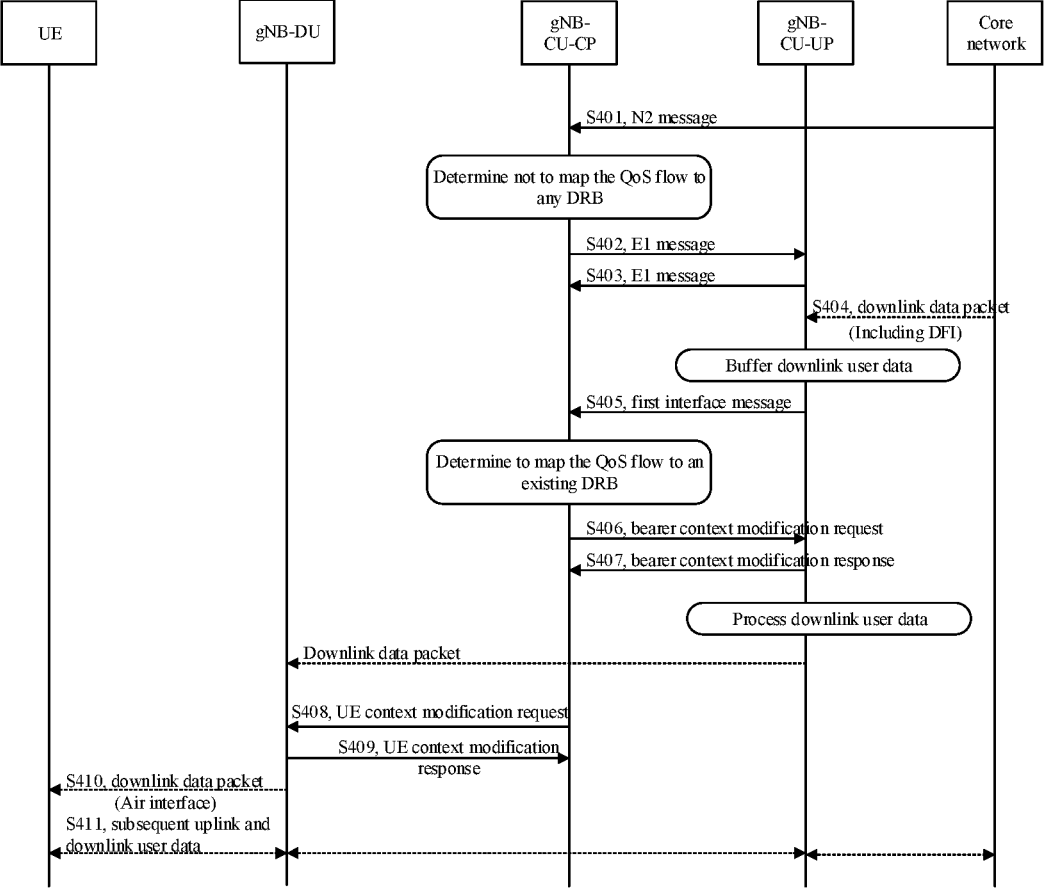

| UE | gNB-DU | gNB-CU-CP | gNB-CU-UP | Core network |
|---|---|---|---|---|

S401, N2 message

Determine not to map the QoS flow to any DRB

S402, E1 message

S403, E1 message

S404, downlink data packet (Including DFI)

Buffer downlink user data

S405, first interface message

Determine to map the QoS flow to an existing DRB

S406, bearer context modification request

S407, bearer context modification response

Process downlink user data

Downlink data packet

S408, UE context modification request

S409, UE context modification response

S410, downlink data packet (Air interface)

S411, subsequent uplink and downlink user data

DATA PROCESSING METHOD AND APPARATUS, NETWORK DEVICE, STORAGE MEDIUM AND PROGRAM PRODUCT

CROSS-REFERENCE TO RELATED APPLICATIONS

This application is a National Stage of International Application No. PCT/CN2022/085365, filed on Apr. 6, 2022, which claims priority to Chinese Patent Application No. 202110373435.0, filed on Apr. 7, 2021, both of which are hereby incorporated by reference in their entireties.

FIELD

The present disclosure relates to the field of communication technologies and, in particular, to a data processing method and apparatus, a network device, a storage medium and a program product.

BACKGROUND

The service data flow in the 5th-Generation (5G) system is organized with the minimum granularity of quality of service flow (QOS flow) to provide different qualities of service for different services.

A QoS flow is identified by a QoS flow identifier (QFI). A QoS flow is transmitted through a data radio bearer (DRB) at the access layer. The actual service quality level of a certain QoS flow depends largely on the service quality parameter(s) of the DRB to which this QoS flow maps, so in most cases, a network maps different QoS flows to different DRBs to ensure the pertinence of transmission scheduling.

SUMMARY

The present disclosure provides a data processing method and apparatus, a network device, a storage medium and a program product, for ensuring that data on a data flow can be transmitted in the manner of meeting a QoS requirement.

In a first aspect, the present disclosure provides a data processing method, which is applied to a first network element in a radio access network and includes:

receiving a downlink data packet, where the downlink data packet includes downlink user data and an identifier of a data flow to which the downlink user data belongs; and transmitting a first interface message to a second network element in the radio access network, where the first interface message includes the identifier of the data flow, and the first interface message is used for determining a target bearer to which the data flow is mapped.

In an implementation, transmitting the first interface message to the second network element in the radio access network includes:

judging whether the data flow is mapped to a bearer according to the identifier of the data flow; and transmitting the first interface message to the second network element in the radio access network if the data flow is not mapped to the bearer or the data flow is mapped to a default bearer.

In an implementation, when the data flow is mapped to the default bearer, the target bearer is a further bearer except the default bearer.

In an implementation, the method further includes:

receiving a second interface message transmitted by the second network element, where the second interface message includes an identifier of a target bearer;

transmitting the downlink user data to a user equipment according to the identifier of the target bearer included in the second interface message.

In an implementation, transmitting the downlink user data to the user equipment according to the identifier of the target bearer included in the second interface message includes:

determining configuration information of the target bearer according to the identifier of the target bearer included in the second interface message, where the configuration information of the target bearer includes a mapping relationship between the target bearer and the data flow;

transmitting the downlink user data to the user equipment based on the mapping relationship.

In an implementation, transmitting the downlink user data to the user equipment based on the mapping relationship includes:

acquiring a downlink address of the target bearer from a third network element in the radio access network based on the mapping relationship;

transmitting the downlink user data to the third network element based on the downlink address of the target bearer, to enable the third network element to transmit the downlink user data to the user equipment through the target bearer.

In an implementation, the method further includes:

transmitting an uplink address of the target bearer to the third network element, where the uplink address is used for instructing the third network element to transmit uplink user data to the first network element through the uplink address.

In an implementation, the target bearer is an existing bearer in a protocol data unit session to which the data flow belongs;

determining the configuration information of the target bearer according to the identifier of the target bearer included in the second interface message includes:

updating configuration information of the existing bearer according to an identifier of the existing bearer included in the second interface message, where the updated configuration information of the existing bearer includes a mapping relationship between the existing bearer and the data flow.

In a second aspect, the present disclosure provides a data processing method, which is applied to a second network element in a radio access network and includes:

receiving a first interface message transmitted by a first network element in the radio access network, where the first interface message includes an identifier of a data flow of downlink user data;

determining a target bearer to which the data flow is mapped according to the first interface message;

transmitting a second interface message to the first network element, where the second interface message includes an identifier of the target bearer, so that the first network element transmits the downlink user data to the user equipment according to the target bearer.

In an implementation, the method further includes:

transmitting a third interface message to a third network element in the radio access network, where the third interface message is used for instructing the third network element and the user equipment to determine configuration information of the target bearer and for instructing the third network element to allocate a downlink address of the target bearer;

receiving the downlink address transmitted by the third network element and transmitting the downlink address to the first network element, to enable the first network element to transmit the downlink user data to the third network element according to the downlink address.

In an implementation, the method further includes:

receiving an uplink address of the target bearer transmitted by the first network element;

transmitting the uplink address to the third network element, to enable the third network element to transmit the uplink user data to the first network element through the uplink address.

In an implementation, the target bearer is an existing bearer in a protocol data unit session to which the data flow belongs.

In an implementation, the method further includes:

transmitting a fourth interface message to a third network element in the radio access network, where the fourth interface message is used for indicating a mapping relationship between the data flow and the target bearer.

In a third aspect, the present disclosure provides a data processing apparatus, which is applied to a first network element in a radio access network and includes:

a receiving device, configured to receive a downlink data packet, where the downlink data packet includes downlink user data and an identifier of a data flow to which the downlink user data belongs;

a transmitting device, configured to transmit a first interface message to a second network element in the radio access network, where the first interface message includes the identifier of the data flow, and the first interface message is used for determining a target bearer to which the data flow is mapped.

In an implementation, the transmitting device is configured to:

judge whether the data flow is mapped to a bearer according to the identifier of the data flow;

transmit the first interface message to the second network element in the radio access network when the data flow is not mapped to the bearer or the data flow is mapped to a default bearer.

In an implementation, if the data flow is mapped to the default bearer, the target bearer is a further bearer except the default bearer.

In an implementation, the receiving device is further configured to:

receive a second interface message transmitted by the second network element, where the second interface message includes an identifier of a target bearer;

the transmitting device is further configured to:

transmit the downlink user data to a user equipment according to the identifier of the target bearer included in the second interface message.

In an implementation, the transmitting device is configured to:

determine configuration information of the target bearer according to the identifier of the target bearer included in the second interface message, where the configuration information of the target bearer includes a mapping relationship between the target bearer and the data flow;

transmit the downlink user data to the user equipment based on the mapping relationship.

In an implementation, the transmitting device is further configured to:

acquire a downlink address of the target bearer from a third network element in the radio access network based on the mapping relationship;

transmit the downlink user data to the third network element based on the downlink address of the target bearer, to enable the third network element to transmit the downlink user data to the user equipment through the target bearer.

In an implementation, the transmitting device is further configured to:

transmit an uplink address of the target bearer to the third network element, where the uplink address is used for instructing the third network element to transmit uplink user data to the first network element through the uplink address.

In an implementation, the target bearer is an existing bearer in a protocol data unit session to which the data flow belongs;

the transmitting device is configured to:

update configuration information of the existing bearer according to an identifier of the existing bearer included in the second interface message, where the updated configuration information of the existing bearer includes a mapping relationship between the existing bearer and the data flow.

In a fourth aspect, the present disclosure provides a data processing apparatus, which is applied to a second network element in a radio access network, including:

a receiving device, configured to receive a first interface message transmitted by a first network element in the radio access network, where the first interface message includes an identifier of a data flow of the downlink user data;

a processing device, configured to determine a target bearer to which the data flow is mapped according to the first interface message; and a transmitting device, configured to transmit a second interface message to the first network element, where the second interface message includes an identifier of the target bearer, so that the first network element transmits the downlink user data to a user equipment according to the target bearer.

In an implementation, the transmitting device is further configured to:

transmit a third interface message to a third network element in the radio access network, where the third interface message is used for instructing the third network element and the user equipment to determine configuration information of the target bearer and for instructing the third network element to allocate a downlink address of the target bearer;

the receiving device is further configured to:

receive the downlink address transmitted by the third network element and transmit the downlink address to the first network element, to enable the first network element to transmit the downlink user data to the third network element according to the downlink address.

In an implementation, the receiving device is further configured to:

receive an uplink address of the target bearer transmitted by the first network element:

the transmitting device is further configured to:

transmit the uplink address to the third network element, to enable the third network element to transmit uplink user data to the first network element through the uplink address.

In an implementation, the target bearer is an existing bearer in a protocol data unit session to which the data flow belongs.

In an implementation, the transmitting device is further configured to:

transmit a fourth interface message to a third network element in the radio access network, where the fourth interface message is used for indicating a mapping relationship between the data flow and the target bearer.

In a fifth aspect, the present disclosure provides a network device including a memory, a transceiver and a processor, where:

the memory is configured to store a computer program;

the transceiver is configured to transmit and receive data under control of the processor; and the processor is configured to read the computer program in the memory and execute the method described in the first aspect and any one of the implementations, or the second aspect and any one of the implementations.

In a sixth aspect, the present disclosure provides a processor-readable storage medium storing a computer program for causing the processor to execute the method described in the first aspect and any one of the implementations, or second aspect and any one of the implementations.

In a seventh aspect, the present disclosure provides a computer program product including a computer program, when the computer program is executed by the processor, the method described in the first aspect and any one of the implementations, or the second aspect and any one of the implementations is implemented.

It should be understood that, the content described in the summary section above is not intended to limit key or important features of the embodiments of the present disclosure, nor is it intended to limit the scope of the present disclosure. Other features of the present disclosure will be readily understood by the following description.

BRIEF DESCRIPTION OF DRAWINGS

FIG. 4 is a schematic flowchart III of a data processing method provided by an embodiment of the present disclosure.

DESCRIPTION OF EMBODIMENTS

Figure 1:
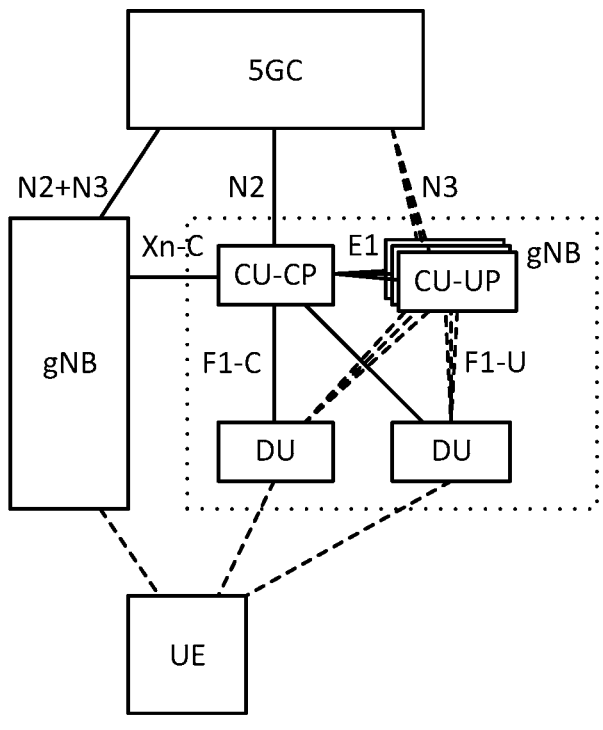
FIG. 1 is a schematic diagram of a 5G system provided by an embodiment of the present disclosure.

The term "and/or" in the present disclosure describes an association relationship between associated objects, and represents that there may exist three relationships. For example, A and/or B may represent three cases: A exists separately, A and B exist simultaneously, and B exists separately. The character "/" generally indicates an "or"

relationship between the associated objects before and after the character. The term "a plurality of" in the embodiments of the present disclosure refers to two or more, and other quantifiers are similar thereto.

The following clearly and comprehensively describes the embodiments of the present disclosure with reference to the accompanying drawings in the embodiments of the present disclosure. Apparently, the described embodiments are merely a part rather than all of the embodiments of the present disclosure.

The embodiments of the present disclosure provide a data processing method and apparatus, so that when a user plane node in a radio access network receives downlink user data, it can notify a control plane node to trigger a bearer configuration process for the data flow, thereby ensuring that the downlink user data can be normally transmitted to a user equipment. Among them, the method and the apparatus are based on the same disclosure, the principles of solving problems are similar, for the embodiments of the apparatus and the method, reference can be made to each other for the same parts, which will not be described here again.

The embodiments of the present disclosure may be applicable to various systems, and in particular, to a 5G system. For example, an applicable system may be a global system of mobile communication (GSM), a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. The various systems all include a terminal device and a network device, and further include a core network part, such as an evolved packet system (EPS), a 5G system (5GS), etc.

The terminal device involved in the embodiments of the present disclosure may be a device that provides voice and/or data connectivity to users, a handheld device with wireless connection function, or other processing devices connected to a wireless modem. In different systems, the name of a terminal device may be different. For example, in a 5G system, a terminal device can be called a user equipment (UE). A wireless terminal device can communicate with one or more core networks (CN) via a radio access network (RAN). A wireless terminal device can be a mobile terminal device, such as a mobile phone (or "cellular" phone) and a computer with a mobile terminal device, such as a portable, pocket-sized, hand-held, computer-built or vehicle-mounted mobile device, which exchanges languages and/or data with the radio access network. For example, a personal communication service (PCS) phone, a cordless phone, a session initiated protocol (SIP) phone, a wireless local loop (WLL) station, a personal digital assistant (PDA), etc. A wireless terminal device can also be called a system, a subscriber unit, a subscriber station, a mobile station, a mobile, a remote station, an access point, a remote terminal, an access terminal, a user terminal, a user agent or a user device, which is not limited in the embodiments.

The base station involved in the embodiments of the present disclosure may include a plurality of cells providing services for terminals. According to different specific disclosures, a base station can also be called an access point, or it can be a device in an access network that communicates with wireless terminal device through one or more sectors through the air interface, etc. For example, the base station involved in the embodiments of the present disclosure may be an evolutional Node B (eNB or e-NodeB) in a long-term evolution (LTE) system, a 5G base station (gNB) in a 5G network architecture (next generation system), or a Home evolved Node B (HeNB), a relay node (relay node), a home base station (femto), a pico base station (pico), etc., which is not limited in the embodiments. In some network structures, a base station may include a centralized unit (CU) node and a distributed unit (, DU) node, where the centralized unit and the distributed unit may also be geographically separated.

Multi Input Multi Output (MIMO) transmission can be performed between the base station and the terminal device by using one or more antennas respectively, and the MIMO transmission can be single user MIMO (SU-MIMO) or multiple user MIMO (MU-MIMO). According to the shape and number of antenna combinations, MIMO transmission can be 2D-MIMO, 3D-MIMO, FD-MIMO or massive-MIMO, and it can also be diversity transmission, precoding transmission or beamforming transmission.

The following introduces the transmission of service data in the 5G system.

Service data in the 5G system is divided into protocol data unit sessions (PDU Session) according to parameters including a data source and a slice attribute, and data in each PDU Session is further divided into several QoS flows. Within the PDU Session, a QoS flow is uniquely identified by a QoS flow identifier (QFI), where the main purpose of dividing different QoS flows is to provide different qualities of service for different service data.

Due to the characteristics of the transmission channel, the link that has the greatest impact on the quality of service usually lies in the air interface, so different qualities of service often show different air interface processing methods, such as different scheduling priorities. In specific processing, a radio access network (NG-RAN) in the 5G system maps QoS flows to DRBs, and adopts different air interface processing methods according to the granularity of DRB, i.e., the same strategy will be adopted for packets belonging to the same DRB in their air interface transmission, no matter which QoS flow the packet belongs to. For each UE, a DRB is uniquely identified by a DRB ID. In the 5G system, multiple QoS flows belonging to the same PDU session are allowed to be mapped to the same DRB, but this means that these QoS flows have to be transmitted using the same air interface processing method. The mapping relationship between QoS flows and DRBs is informed to UE through radio resource control (RRC) signaling.

In order to make more effective and targeted use of air interface resources, the NG-RAN often chooses to conduct one-to-one mapping of QoS flows to DRBs. However, due to the limited underlying resources, in order to avoid the DRB ID to occupy too many bits, the maximum number of DRBs that can be established for each UE is defined as 32. Compared with the fact that at most 256 PDU sessions can be established for each UE in the non-access layer and each PDU session can contain at most 64 QoS flows, the number of DRBs is very small. Therefore, the problem of insufficient number of DRB IDs would occur if the NG-RAN chooses to conduct one-to-one mapping of QoS flows to DRBs.

In view of this, the industry proposes that for those QoS flows with relatively infrequent data transmission and no data at present, the NG-RAN can temporarily not map them to any DRBs, or only map them to the default DRB(s), and specify DRBs for them when there is data to be transmitted in these QoS flows, and then inform the user equipment through RRC signaling and transmit the data, where there is only one default DRB for each PDU session at most, which is used as the default DRB of the PDU session. It can be understood that the default DRB can be used only as a default mapping for data flows, which cannot guarantee the QoS requirements of all data flows, and other DRBs except the default DRB are called non-default DRBs.

When instructing the NG-RAN to establish QOS flows, the core network can mark some QoS flows as "more prone to have data to be transmitted", and mark other QoS flows as "relatively rare" QoS flows. According to this information, the NG-RAN can selectively map simply a part of QoS flows to DRBs, and temporarily do not map the remaining QoS flows, or simply map them to the default DRB. When a downlink data packet needs to be transmitted on a QoS flow that is temporarily not mapped or mapped to the default DRB, the core network will not transmit any control plane signaling specifically for the data packet, but will directly transmit the data packet to the NG-RAN through the user plane channel for the PDU session with the QFI of the QoS flow attached. Under the condition that a central module-control plane (CU-CP) and a central module-user plane (CU-UP) of the NG-RAN are not separated, the NG-RAN can choose to establish a DRB for the QoS flow for transmission or map the QoS flow to an existing DRB for transmission after receiving the data packet.

However, in view of the separation of the CU-CP and the CU-UP in the NG-RAN, the NG-RAN cannot realize the above transmission process after receiving the downlink data packet. It will be explained in combination with the 5G NR network architecture shown in FIG. 1.

In the NG-RAN, a logical NG-RAN node can be further divided into a CU-CP, one or more CU-UPs, and one or more distributed units (Unit,DUs). This structure is called CU-CP/UP split (CU-CP/UP split).

As shown in FIG. 1, in the case that the NG-RAN node is an NG-RAN node that adopts the new radio (NR) technology, i.e., gNB, a gNB-CU-CP and a gNB-DU are connected via an F1-C interface, while the gNB-CU-CP and a gNB-CU-UP are connected via an E1 interface. The control plane connection N2 between the gNB and a core network (5G Core, 5GC) ends at the gNB-CU-CP, while the air interface connection between the gNB and the UE ends at the gNB-DU.

When there is user plane data to be transmitted, an N3 transmission channel will be established between the gNB-CU-UP and the 5GC, and an F1-U transmission channel will be established between the gNB-DU and the gNB-CU-UP. For air interface control plane functions that involve the organization of services, such as air interface control plane functions that involve how QoS flows and DRBs are mapped, since they involve both of the gNB-DU and the gNB-CU-UP, in order to facilitate unified control and management, this part of air interface functions interact with the UE through an RRC device in the gNB-CU-CP, and the exchanged signaling is called RRC signaling. In particular, downlink RRC signaling is generated by the gNB-CU-CP, and after being encapsulated into a layer 2 packet, it is transmitted to the gNB-DU through the F1-C, and then forwarded to the UE through the air interface.

Similarly, in the case that the NG-RAN node is a node adopting the evolved universal terrestrial radio access (E-UTRA) technology, i.e., in the case that the NG-RAN node is an ng-eNB, an eNB-CU-CP and an eNB-DU are connected via a W1-C interface, while the eNB-CU-CP and an eNB-CU-UP are connected via an E1 interface. The control plane connection N2 between the ng-eNB and the 5GC ends at the eNB-CU-CP, while the air interface connection between the ng-eNB and the UE ends at the eNB-DU.

When there is user plane data to be transmitted, an N3 transmission channel will be established between the eNB-CU-UP and the 5GC, and a W1-U transmission channel will be established between the eNB-DU and the eNB-CU-UP. The other functions are similar to the functions of the above gNB.

Through the introduction of the above architecture, it can be seen that for a certain QoS flow, when the CU-CP determines not to map it to any DRB temporarily or only map it to the default DRB, if downlink data belonging to this QoS flow arrives at the CU-UP from the core network, due to CU-CP/UP split, the CU-CP cannot know that the downlink data of this QoS flow arrives at the CU-UP. Therefore, subsequent remapping and other processes cannot be triggered, so that the downlink data cannot be transmitted through the air interface at all, or a QoS requirement cannot be guaranteed when it is transmitted through the air interface, and the subsequent data packets on the QoS flow cannot be transmitted through the air interface in the manner of meeting a QoS requirement for the same reason.

In order to solve the above problem, the embodiments of the present disclosure propose that when the user plane central node of the radio access network receives a downlink data packet, and the downlink data packet belongs to a data flow that is not mapped to any radio bearer, or belongs to a data flow that is only mapped to a default radio bearer, the user plane central node needs to re-acquire a radio bearer to which the data flow is mapped from the control plane central node of the radio access network, so as to ensure that the downlink data packet and subsequent data packets on the data flow can be transmitted between the radio access network and UE through the air interface in the manner of meeting a QoS requirement.

The data processing method of the present disclosure will be described in detail below with reference to specific embodiments. The following specific embodiments may be implemented independently or combined with each other, and the same or similar concept or process may not be repeated in some embodiments.

Figure 2:
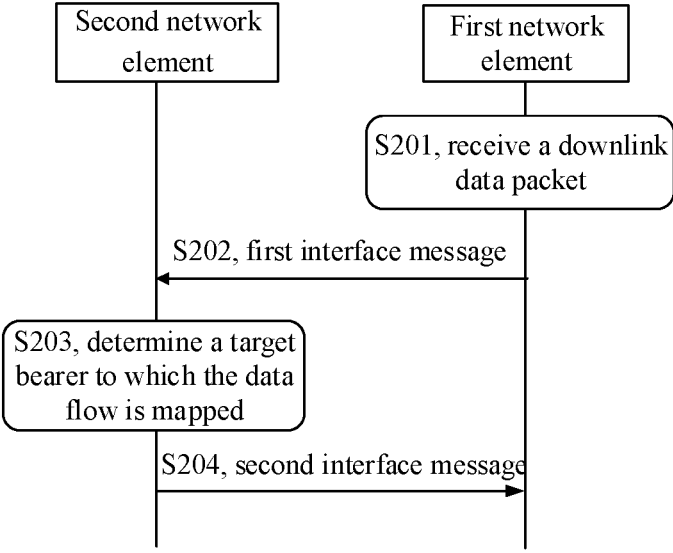
FIG. 2 is a schematic flowchart I of a data processing method provided by an embodiment of the present disclosure.

FIG. 2 is a schematic flowchart of a data processing method provided by an embodiment of the present disclosure. The method is applied to a first network element and a second network element in a radio access network. For example, the first network element is a user plane central node and the second network element is a control plane central node. As shown in FIG. 2, the method includes:

S201: a first network element receives a downlink data packet.

The downlink data packet includes downlink user data and an identifier of a data flow to which the downlink user data belongs.

The downlink data packet received by the first network element is transmitted by a core network, and the first network element can determine, according to the identifier of the data flow in the downlink data packet, whether the data flow to which the downlink user data in the downlink data packet belongs has been mapped to an appropriate bearer. For the data flow that has been mapped to an appropriate bearer, the first network element can normally transmit the downlink data packet based on the bearer, while for the data flow that has not been mapped to an appropriate bearer, the first network element needs to perform subsequent steps to trigger the bearer mapping of the data flow.

The identifier of the data flow can be a QFI or other identifier information that can characterize the data flow.

In an implementation, "the data flow is mapped to an appropriate bearer" may mean that the data flow is mapped to any bearer, and the corresponding "the data flow is not mapped to an appropriate bearer" means that the data flow is not mapped to any bearer.

In another implementation, "the data flow is mapped to an appropriate bearer" may mean that the data flow is mapped to a non-default bearer, and the corresponding "the data flow is not mapped to an appropriate bearer" means that the data flow is not mapped to any non-default bearer. The default bearer is a default bearer for a PDU session, and it can be used simply as a default mapping bearer for a data flow; which cannot guarantee a QoS requirement of the data flow:

In addition, it should be noted that the mapping relationship between the data flow and the bearer can be without distinguishing between uplink and downlink data, i.e., the data flow can be mapped directly, or it can be with distinguishing between uplink and downlink data, i.e., the uplink data and downlink data in the data flow can be mapped separately. The above-mentioned data flow that is not mapped to any appropriate bearer may mean that the data flow is not mapped to any appropriate bearer in the case that no distinguishment is made between uplink and downlink data, or that downlink data and/or uplink data of the data flow is not mapped to any appropriate bearer in the case that distinguishment is made between uplink and downlink data, which is not limited in the embodiments of the present disclosure.

S202: the first network element transmits a first interface message to the second network element in the radio access network.

The first interface message includes the identifier of the data flow, and the first interface message is used for determining a target bearer to which the data flow is mapped.

Since the mapping relationship between the data flow and the bearer is determined by the second network element, in the embodiments of the present disclosure, when the first network element determines according to the identifier of the data flow that the data flow to which the received downlink data packet belongs is not mapped to any appropriate bearer, it transmits a first interface message to the second network element, and carries the identifier of the data flow in the first interface message, so that the second network element can know that the first network element has received a data packet of the data flow that is not mapped to any appropriate bearer, thus triggering the second network element to map the data flow to a bearer.

S203: the second network element determines a target bearer to which the data flow is mapped according to the first interface message.

After receiving the first interface message, the second network element maps the data flow to a target bearer according to the identifier of the data flow in the first interface message, and the target bearer can be a newly created bearer or an existing bearer in a PDU session to which the data flow belongs. In an implementation, in the scenario where the data flow is mapped to the default bearer, the target bearer is a further bearer except the default bearer.

S204: the second network element transmits a second interface message to the first network element.

The second interface message includes an identifier of the target bearer, so that the first network element transmits downlink user data to the user equipment according to the target bearer.

Illustratively, the second interface message may include the identifier of the data flow and the identifier of the target bearer, so that after receiving the second interface message, the first network element can determine the target bearer corresponding to the data flow based on the identifier of the target bearer indicated in the second interface message, and transmit the downlink user data to the user equipment based on the target bearer.

Illustratively, the first network element may transmit the downlink user data to the user equipment through a third network element in the radio access network based on the target bearer. The third network element can be a distributed node of the radio access network, and the third network element can transmit the downlink user data to the user equipment through the target bearer.

In the data processing method provided by the embodiments of the present disclosure, after receiving the downlink data packet, the first network element can determine whether the data flow to which the downlink data packet belongs is mapped to an appropriate bearer according to the identifier of the data flow therein, and for the data flow that is not mapped to an appropriate bearer, the first network element transmits an interface message to the second network element, to trigger the second network element to re-map the data flow to the target bearer, so as to ensure that the downlink data packet and subsequent data packets on the data flow can be transmitted between the radio access network and the user equipment through the air interface in the manner of meeting a QoS requirement.

On the basis of the above embodiments, in view of the two situations that the target bearer is a new bearer and the target bearer is a bearer that already exists in the PDU session (an existing bearer), the subsequent processing procedure of each node in the radio access network will be slightly different after the second network element transmits the second interface message to the first network element.

When the target bearer is a new bearer, after the second network element determines to map the data flow to the target bearer, the first network element, the third network element and the user equipment all need to determine corresponding configuration information of the target bearer. Therefore, in addition to transmitting a second interface message to the first network element to instruct the first network element to determine the configuration information of the target bearer, the second network element can transmit a third interface message to the third network element, where the third interface message is used for instructing the third network element and the user equipment to determine the configuration information of the target bearer, and for instructing the third network element to allocate a downlink address of the target bearer. The configuration of the target bearer determined by the first network element and the third network element both include a mapping relationship between the target bearer and the data flow; so that the first network element transmits downlink user data to the user equipment based on the mapping relationship. It can be understood that the configuration information of the target bearer includes not only the corresponding relationship between the target bearer and the data flow; but also other configuration information required by the target bearer to transmit data.

Besides determining the configuration information of the target bearer according to the second interface message, the first network element can also receive the downlink address of the target bearer transmitted by the third network element through the second network element, and then transmit downlink user data to the third network element based on the downlink address of the target bearer, so that the third network element transmits the downlink user data to the user equipment through the target bearer. In an implementation, the first network element can also transmit an uplink address of the target bearer to the third network element, where the uplink address is used for instructing the third network element to transmit the uplink user data to the first network element through the uplink address.

When the target bearer is an existing bearer in the PDU session, the first network element, the third network element and the user equipment already have the corresponding configuration information of the target bearer (i.e., the existing bearer), so the second network element simply needs to indicate the mapping relationship between the data flow and the existing bearer to the first network element and the third network element. Therefore, after the second network element determines, according to the first interface message, the existing bearer as the target bearer from bearers of the PDU session to which the data flow belongs, it transmits a second interface message to the first network element, so that the first network element updates the configuration information of the existing bearer according to the second interface message, where the updated configuration information of the existing bearer includes the mapping relationship between the existing bearer and the data flow. For example, if there is no further mapped data flow in the existing bearer, the mapping relationship between the existing bearer and the data flow is added in the configuration of the existing bearer, or if there is a further mapped data flow in the existing bearer, the mapping relationship between the existing bearer and data flows can be modified in the configuration of the existing bearer. In addition, the second network element transmits a fourth interface message to the third network element, and the fourth interface message is used for indicating the mapping relationship between the data flow and the existing bearer to the third network element, so that the third network element updates the configuration information of the existing bearer according to the fourth interface message.

The above two situations will be described in more details with specific embodiments.

Figure 3:
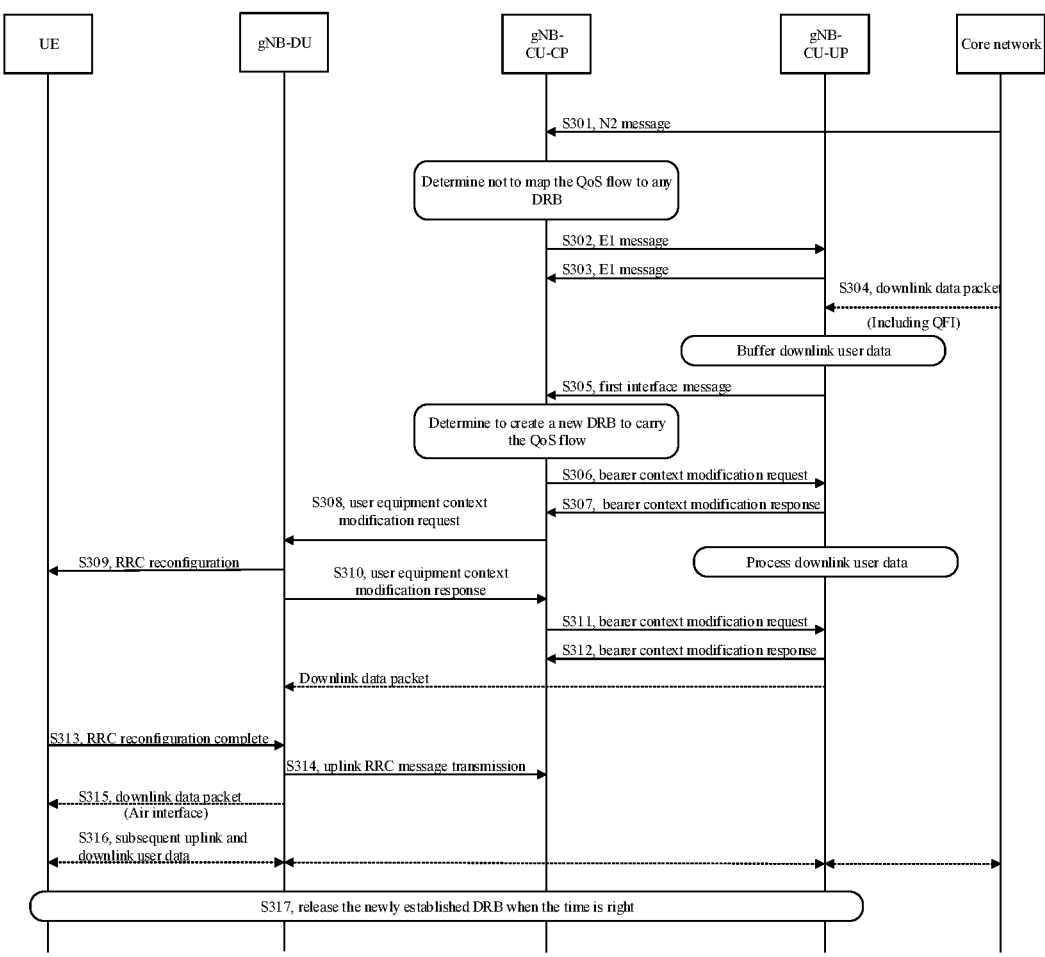
FIG. 3 is a schematic flowchart II of a data processing method provided by an embodiment of the present disclosure.

FIG. 3 is a schematic diagram of interaction among the core network, the radio access network and the user equipment when the target bearer is a new bearer. As shown in FIG. 3, the gNB-CU-UP is the first network element, the gNB-CU-CP is the second network element, and the gNB-DU is the third network element.

S301: the core network transmits an N2 interface message to the gNB-CU-CP.

The N2 interface message is used for instructing the gNB-CU-CP to establish a PDU session for the UE, where the PDU session includes a QoS flow, for the transmission bit rate does not need to be guaranteed, and QoS parameters of the PDU session do not include an indication that "this QoS flow is more likely to have data transmission than other QoS flows", so this QoS flow is regarded as a QoS flow with infrequent data transmission. The flow identifier of the QoS flow, namely QFI, is assumed to be 1.

S302: the gNB-CU-CP transmits an E1 interface message to the gNB-CU-UP.

Considering that the number of DRB IDs is limited and the QoS flow is a QoS flow with infrequent data transmission, the gNB-CU-CP determines not to map the QoS flow to any DRB temporarily. At this time, the gNB-CU-CP transmits an E1 interface message to the gNB-CU-UP, which is used for requesting the gNB-CU-UP to establish a corresponding context for the PDU session, including assigning an N3 channel downlink transmission address for the PDU session. In an implementation, the E1 interface message also includes an indication for requesting the gNB-CU-UP to monitor the user plane activity.

S303: the gNB-CU-UP feeds back an E1 interface message to the gNB-CU-CP.

The gNB-CU-UP establishes the context for the PDU session, and feeds back an E1 interface message to the gNB-CU-CP, which includes the N3 channel downlink transmission address allocated by the gNB-CU-UP for the PDU session. S304: the core network transmits a downlink data packet to the gNB-CU-UP.

At a certain moment, the core network finds that there is downlink data belonging to the above QoS flow in the PDU session that needs to be transmitted to the UE. Therefore, the core network transmits an N3 downlink data packet to the gNB-CU-UP through the established N3 transmission channel, the data packet contains downlink user data that needs to be transmitted, and a QFI with a value of 1 which is used for indicating the QoS flow to which the downlink user data belongs.

S305: the gNB-CU-UP transmits a first interface message to the gNB-CU-CP.

The gNB-CU-UP determines that the corresponding QoS flow is not mapped to any DRB according to the QFI, so it cannot be transmitted to the UE through the air interface. Therefore, the gNB-CU-UP buffers the downlink packet and transmits a first interface message to the gNB-CU-CP, the first interface message is an E1 interface message. The first interface message includes the QFI of the QoS flow to indicate that the gNB-CU-UP has received the data packet transmitted by the core network, and the QoS flow to which the data packet belongs is not mapped to any DRB.

S306: the gNB-CU-CP transmits a bearer context modification request message to the gNB-CU-UP.

After receiving the first interface message, the gNB-CU-CP determines to create a new DRB to carry the QoS flow. Therefore, the gNB-CU-CP transmits a bearer context modification request message to the gNB-CU-UP, which is an E1 interface message. In an implementation, the bearer context modification request message is the foregoing second interface message, which contains the identifier of the target bearer, i.e., the ID of the DRB, and the DRB contains the QFI with the value of 1 to indicate that the QoS flow is mapped to the DRB. In an implementation, the bearer context modification request message also contains other configuration information of the DRB.

S307: the gNB-CU-UP transmits a bearer context modification response message to the gNB-CU-CP.

The gNB-CU-UP establishes the configuration of the DRB, and transmits a bearer context modification response message to the gNB-CU-CP, which is an E1 interface message. In an implementation, the gNB-CU-UP allocates an uplink F1-U address to the DRB when establishing the configuration of the DRB, and the bearer context modification response message transmitted by the gNB-CU-CP includes the uplink F1-U address. At the same time, the gNB-CU-UP starts to process the packet according to the DRB configuration provided by the gNB-CU-CP until the packet is encapsulated into a layer 2 packet that can be transmitted through the F1-U channel.

S308: the gNB-CU-CP transmits a user equipment context modification request message to the gNB-DU.

The UE context modification request message is transmitted by the gNB-CU-CP to the gNB-DU through the F1-C channel. The user equipment context modification request message is used for requesting the gNB-DU to establish underlying configuration of the DRB and requesting the gNB-DU to allocate a downlink F1-U address. In an implementation, in the case that the bearer context modification response message transmitted by the gNB-CU-CP includes the uplink F1-U address, the user equipment context modification request message is also used for informing the gNB-DU of the uplink F1-U address of the DRB. In addition, the user equipment context modification request message also includes an encapsulated RRC reconfiguration message, which is used for requesting the UE to establish the configuration of the DRB, so that the UE can receive the data packet belonging to the QoS flow through the DRB. The user equipment context modification request message can be the third interface message in the foregoing embodiments.

S309: the gNB-DU transmits an RRC reconfiguration message to the UE.

After the gNB-DU confirms that the underlying configuration of the DRB can be established, it further encapsulates the encapsulated the RRC reconfiguration message into a form that can be transmitted through the air interface, and then transmits the same to the UE.

S310: the gNB-DU feeds back a user equipment context modification response message to the gNB-CU-CP.

The gNB-DU establishes the underlying configuration of the DRB, allocates the downlink F1-U address of the DRB, and then feeds back a user equipment context modification response message to the gNB-CU-CP through the F1-C channel, where the user equipment context modification response message includes the downlink F1-U address of the DRB.

S311: the gNB-CU-CP transmits a bearer context modification request message to the gNB-CU-UP.

The bearer context modification request message contains the downlink F1-U address of the DRB. The bearer context modification request message is an E1 interface message.

S312: the gNB-CU-UP transmits a bearer context modification response message to the gNB-CU-CP.

The bearer context modification response message is used for indicating that the gNB-CU-UP has updated its configuration, and at the same time, the gNB-CU-UP transmits the above layer 2 packet to the gNB-DU through the F1-U channel. The bearer context modification response message is an E1 interface message.

S313: the UE feeds back an RRC reconfiguration complete message to the gNB-DU.

After receiving the RRC reconfiguration message transmitted by the gNB-DU in S309, the UE establishes the configuration of the DRB, and feeds back an RRC reconfiguration complete message through the air interface.

S314: the gNB-DU feeds back an RRC reconfiguration complete message to the gNB-CU-CP.

The gNB-DU decapsulates the RRC reconfiguration complete message transmitted through the air interface into an encapsulated RRC reconfiguration complete message that can be transmitted over the F1-C interface, and then transmits it to the gNB-CU-CP through an uplink RRC message transmission message.

S315: the gNB-DU transmits the downlink data packet to the UE.

After both S312 and S313 are completed, the gNB-DU performs underlying processing on the layer 2 packet received in S312, and then transmits the layer 2 packet to the UE through the air interface. The UE uses the configuration of the DRB established in S313 to decode the transmitted downlink user data from this air interface data packet.

S316: subsequent uplink and downlink user data.

After the above downlink data packet, the core network or the UE may transmit uplink and downlink data packets belonging to this QoS flow. On the basis of the mapping and configuration of the DRB in the above steps, the gNB-CU-UP, the gNB-DU and the UE transmit the subsequent uplink and downlink user data through the DRB established in the above steps.

S317: release the DRB.

If there is no data on the DRB for a long time, the gNB-CU-UP will transmit a bearer context inactive notification message to the gNB-CU-CP. When the time is right, the gNB-CU-CP can trigger the gNB-CU-UP, the gNB-DU and the UE to release the established DRB. The specific duration of the above-mentioned long time and the timing of the release can be set in advance.

It should be noted that in FIG. 3, an example is taken for description where the NG-RAN node is the gNB. When the NG-RAN node adopts ng-eNB, it only needs to replace gNB-CU-CP with eNB-CU-CP, gNB-CU-UP with eNB-CU-UP, gNB-DU with eNB-DU, F1 interface with W1 interface in the above embodiments with other processes unchanged, so details will not be described here again.

In addition, in S302 of FIG. 3, an example is taken for description where the gNB-CU-CP determines not to map the QoS flow to any DRB temporarily. It can be understood that when the gNB-CU-CP determines to map the QoS flow to the default DRB temporarily, and gNB-CU-CP receives the downlink packet of the Qos flow in the subsequent steps, the process of triggering the gNB-CU-CP through the first interface message to re-map the bearer is similar to the above.

FIG. 4 is a schematic diagram of interaction among the core network, the radio access network and the UE when the target bearer is an existing bearer. As shown in FIG. 4, the gNB-CU-UP is the first network element, the gNB-CU-CP is the second network element, and the gNB-DU is the third network element.

S401: the core network transmits an N2 interface message to the gNB-CU-CP.

The N2 interface message is used for instructing the gNB-CU-CP to establish a PDU session for the UE, where the PDU session includes a QoS flow; for which the transmission bit rate does not need to be guaranteed, and its QoS parameters do not include the indication that "this QoS flow is more likely to have data transmission than other QoS flows", so this QoS flow is regarded as a QoS flow with infrequent data transmission. The flow identifier of the QoS flow, namely QFI, is assumed to be 1.

S402: the gNB-CU-CP transmits an E1 interface message to the gNB-CU-UP.

Considering that the number of DRB IDs is limited and the QoS flow is a QoS flow with infrequent data transmission, the gNB-CU-CP determines not to map the QoS flow to any DRB temporarily. At this time, the gNB-CU-CP transmits an E1 interface message to the gNB-CU-UP, which is used for requesting the gNB-CU-UP to establish a corresponding context for the PDU session, including assigning an N3 channel downlink transmission address for the PDU session. In addition, the E1 interface message also contains an indication for requesting the gNB-CU-UP to establish at least one DRB for the PDU session, where the DRB may not contain any QoS flows and simply operate as the default DRB for the PDU session. The process of establishing at least one DRB for the PDU session here is the same as those in related technologies, so it will not be described here again.

S403: the gNB-CU-UP feeds back an E1 interface message to the gNB-CU-CP.

The gNB-CU-UP establishes the context for the PDU session, and feeds back an E1 interface message to the gNB-CU-CP, which includes the N3 channel downlink transmission address allocated by the gNB-CU-UP for the PDU session.

S404: the core network transmits a downlink data packet to the gNB-CU-UP.

At a certain moment, the core network finds that there is downlink data belonging to the above QoS flow in the PDU session that needs to be transmitted to the UE. Therefore, the core network transmits an N3 downlink data packet to the gNB-CU-UP through the established N3 transmission channel, the data packet contains downlink user data that needs to be transmitted, and a QFI with a value of 1 which is used for indicating the QoS flow to which the downlink user data belongs.

S405: the gNB-CU-UP transmits a first interface message to the gNB-CU-CP.

The gNB-CU-UP determines that the corresponding QoS flow is not mapped to any DRB according to the QFI, so it cannot be transmitted to the UE through the air interface. Therefore, it buffers the downlink packet and transmits a first interface message to the gNB-CU-CP, which is an E1 interface message. The first interface message includes the QFI of the QoS flow to indicate that the gNB-CU-UP has received the data packet transmitted by the core network, and the QoS flow to which the data packet belongs is not mapped to any DRB.

S406: the gNB-CU-CP transmits a bearer context modification request message to the gNB-CU-UP.

After receiving the first interface message, the gNB-CU-CP determines to use an existing DRB belonging to the PDU session to carry the QoS flow. Therefore, the gNB-CU-CP transmits a bearer context modification request message to the gNB-CU-UP, which is an E1 interface message. In an implementation, the bearer context modification request message is the foregoing second interface message, which contains the identifier of the target bearer, i.e., the ID of the DRB, and the DRB contains the QFI with the value of 1 to indicate that the QoS flow is mapped to the DRB.

S407: the gNB-CU-UP transmits a bearer context modification response message to the gNB-CU-CP.

The gNB-CU-UP updates configuration of the DRB according to the bearer context modification request message transmitted by the gNB-CU-CP, for example, adds a mapping relationship between the DRB and the QoS flow in the configuration of the DRB, and transmits a bearer context modification response message to the gNB-CU-CP to indicate that the configuration has been updated, which is an E1 interface message. At the same time, the gNB-CU-UP starts to process the packet according to the DRB configuration provided by the gNB-CU-CP until the packet is encapsulated into a layer 2 packet that can be transmitted through the F1-U channel and transmit it to the gNB-DU through the F1-U channel.

S408: the gNB-CU-CP transmits a user equipment context modification request message to the gNB-DU.

The user equipment context modification request message is transmitted by the gNB-CU-CP to the gNB-DU through the F1-C channel. The user equipment context modification request message is used for notifying the gNB-DU that the Qos flow has been mapped to the DRB. The user equipment context modification request message can be the fourth interface message in the foregoing embodiments.

S409: the gNB-DU feeds back a user equipment context modification response message to the gNB-CU-CP.

The user equipment context modification response message indicates that the foregoing user equipment context modification request message has been received.

S410: the gNB-DU transmits the downlink data packet to the UE.

The gNB-DU performs underlying processing on the layer 2 packet that it has received in S407, and then transmits the layer 2 packet to the UE through the air interface. The UE uses the configuration of the previously established DRB to decode the transmitted downlink user data from this air interface data packet.

S411: subsequent uplink and downlink user data.

After the above downlink data packet, the core network or the UE may transmit uplink and downlink data packets belonging to the QoS flow. On the basis of the mapping of the DRB in the above steps, the gNB-CU-UP, the gNB-DU and the UE transmit the subsequent uplink and downlink user data through the DRB established in the above steps.

It should be noted that in FIG. 4, an example is taken for description where the NG-RAN node is the gNB. When the NG-RAN node adopts ng-eNB, it needs only to replace gNB-CU-CP with eNB-CU-CP, gNB-CU-UP with eNB-CU-UP, gNB-DU with eNB-DU, F1 interface with W1 interface in the above embodiments with other processes unchanged, so they will not be described here again.

In addition, in S402 of FIG. 4, an example is taken for description where the gNB-CU-CP determines not to map the QoS flow to any DRB temporarily. It can be understood that when the gNB-CU-CP determines to map the QoS flow to the default DRB temporarily and the gNB-CU-CP receives the downlink packet of the QoS flow in the subsequent steps, the process of triggering the gNB-CU-CP through the first interface message to re-map the bearer is similar to the above.

Figure 5:
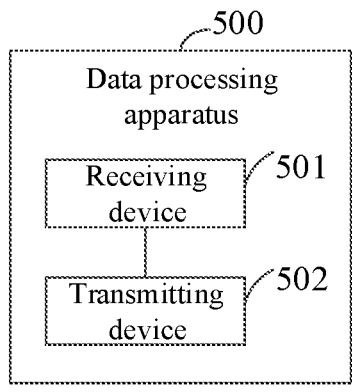
FIG. 5 is a schematic diagram I of a data processing apparatus provided by an embodiment of the present disclosure.

FIG. 5 is a schematic diagram I of a data processing apparatus provided by an embodiment of the present disclosure. The data processing apparatus 500 is applied to a first network element in a radio access network, including:

a receiving device 501, configured to receive a downlink data packet, where the downlink data packet includes downlink user data and an identifier of a data flow to which the downlink user data belongs; and a transmitting device 502, configured to transmit a first interface message to a second network element in the radio access network, where the first interface message includes the identifier of the data flow, and the first interface message is used for determining a target bearer to which the data flow is mapped.

In an implementation, the transmitting device 502 is configured to:

judge whether the data flow is mapped to a bearer according to the identifier of the data flow;

transmit the first interface message to the second network element in the radio access network when the data flow is not mapped to the bearer or the data flow is mapped to a default bearer.

In an implementation, when the data flow is mapped to the default bearer, the target bearer is a further bearer except the default bearer.

In an implementation, the receiving device 501 is further configured to:

receive a second interface message transmitted by the second network element, where the second interface message includes an identifier of a target bearer;

the transmitting device 502 is further configured to:

transmit the downlink user data to a user equipment according to the identifier of the target bearer included in the second interface message.

In an implementation, the transmitting device 502 is configured to:

determine configuration information of the target bearer according to the identifier of the target bearer included in the second interface message, where the configuration information of the target bearer includes a mapping relationship between the target bearer and the data flow;

transmit the downlink user data to the user equipment based on the mapping relationship.

In an implementation, the transmitting device 502 is further configured to:

acquire a downlink address of the target bearer from a third network element in the radio access network based on the mapping relationship;

transmit the downlink user data to the third network element based on the downlink address of the target bearer, to enable the third network element to transmit the downlink user data to the user equipment through the target bearer.

In an implementation, the transmitting device 502 is further configured to:

transmit an uplink address of the target bearer to the third network element, where the uplink address is used for instructing the third network element to transmit uplink user data to the first network element through the uplink address.

In an implementation, the target bearer is an existing bearer in a protocol data unit session to which the data flow belongs;

the transmitting device 502 is configured to:

update configuration information of the existing bearer according to an identifier of the existing bearer included in the second interface message, where the updated configuration information of the existing bearer includes a mapping relationship between the existing bearer and the data flow.

It should be noted that, the foregoing apparatus provided by the present disclosure can implement all method steps implemented by the first network element in the foregoing method embodiments, and can achieve the same effects. The parts and beneficial effects of this embodiment that are the same as those of the method embodiments are not described here again.

Figure 6:
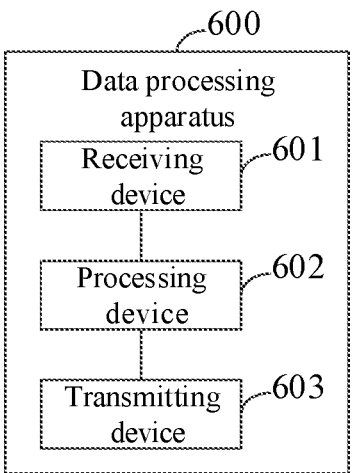
FIG. 6 is a schematic diagram II of a data processing apparatus provided by an embodiment of the present disclosure.

FIG. 6 is a schematic diagram II of a data processing apparatus provided by an embodiment of the present disclosure. The data processing apparatus 600 is applied to a second network element in a radio access network, including:

a receiving device 601, configured to receive a first interface message transmitted by a first network element in the radio access network, where the first interface message includes an identifier of a data flow of the downlink user data;

a processing device 602, configured to determine a target bearer to which the data flow is mapped according to the first interface message; and a transmitting device 603, configured to transmit a second interface message to the first network element, where the second interface message includes an identifier of the target bearer, so that the first network element transmits the downlink user data to a user equipment according to the target bearer.

In an implementation, the transmitting device 603 is further configured to:

transmit a third interface message to a third network element in the radio access network, where the third interface message is used for instructing the third network element and the user equipment to determine configuration information of the target bearer and for instructing the third network element to allocate a downlink address of the target bearer;

the receiving device 601 is further configured to:

receive the downlink address transmitted by the third network element and transmit the downlink address to the first network element, to enable the first network element to transmit the downlink user data to the third network element according to the downlink address.

In an implementation, the receiving device 601 is further configured to:

receive an uplink address of the target bearer transmitted by the first network element;

the transmitting device 603 is further configured to:

transmit the uplink address to the third network element, to enable the third network element to transmit uplink user data to the first network element through the uplink address.

In an implementation, the target bearer is an existing bearer in a protocol data unit session to which the data flow belongs.

In an implementation, the transmitting device 603 is further configured to:

transmit a fourth interface message to a third network element in the radio access network, where the fourth interface message is used for indicating a mapping relationship between the data flow and the target bearer.

It should be noted that, the foregoing apparatus provided by the present disclosure can implement all method steps implemented by the second network element in the foregoing method embodiments, and can achieve the same effects. The parts and beneficial effects of this embodiment that are the same as those of the method embodiments are not described here again.

It should be noted that division of the devices in the embodiments of the present disclosure is schematic, which is merely logical function division and may be other division in actual implementations. In addition, various functional devices in the embodiments of the present disclosure may be integrated into one processing device, or each of the devices may exist separately, or two or more devices are integrated into one device. The integrated device may be implemented in a form of hardware, and may also be implemented in a form of a software functional device.

If the integrated device is implemented in the form of the software functional device and sold or used as an independent product, the integrated device may be stored in a processor-readable storage medium. Based on such understanding, a embodiments of the present disclosure essentially, or the part contributing to the prior art, or all or a part of the embodiments may be implemented in a form of a software product. The computer software product is stored in a storage medium and includes several instructions for causing a computer device (which may be a personal computer, a server, or a network device, etc.) or a processor to execute all or part of the steps of the methods described in the embodiments of the present disclosure. The foregoing storage medium includes: any medium that can store program codes, such as a USB flash disk, a mobile hard disk, a read-only memory (ROM), a random access memory (RAM), a magnetic disk, or an optical disk, etc.

Figure 7:
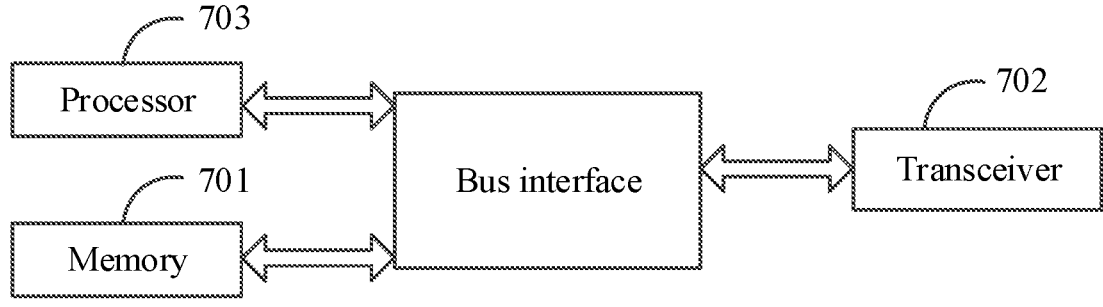
FIG. 7 is a schematic diagram of a network device provided by an embodiment of the present disclosure.

FIG. 7 is a schematic diagram of a network device provided by embodiment of the present disclosure. As shown in FIG. 7, a base station 700 includes a memory 701, a transceiver 702 and a processor 703, where:

the memory 701 is configured to store a computer program;

the transceiver 702 is configured to receive and transmit data under control of the processor 703; and the processor 703 is configured to read the computer program in the memory 701 and perform the following operations:

receiving a downlink data packet, where the downlink data packet includes downlink user data and an identifier of a data flow to which the downlink user data belongs;

transmitting a first interface message to a second network element in a radio access network, where the first interface message includes the identifier of the data flow, and the first interface message is used for determining a target bearer to which the data flow is mapped.

In an implementation, the processor 703 is configured to:

judge whether the data flow is mapped to a bearer according to the identifier of the data flow;

transmit the first interface message to the second network element in the radio access network when the data flow is not mapped to the bearer or the data flow is mapped to a default bearer.

In an implementation, when the data flow is mapped to the default bearer, the target bearer is a further bearer except the default bearer.

In an implementation, the processor 703 is configured to:

receive a second interface message transmitted by the second network element, where the second interface message includes an identifier of a target bearer;

transmit the downlink user data to a user equipment according to the identifier of the target bearer included in the second interface message.

In an implementation, the processor 703 is configured to:

determine configuration information of the target bearer according to the identifier of the target bearer included in the second interface message, where the configuration information of the target bearer includes a mapping relationship between the target bearer and the data flow;

transmit the downlink user data to the user equipment based on the mapping relationship.

In an implementation, the processor 703 is configured to:

acquire a downlink address of the target bearer from a third network element in the radio access network based on the mapping relationship; and transmit the downlink user data to the third network element based on the downlink address of the target bearer, to enable the third network element to transmit the downlink user data to the user equipment through the target bearer.

In an implementation, the processor 703 is configured to:

transmit an uplink address of the target bearer to the third network element, where the uplink address is used for instructing the third network element to transmit uplink user data to the first network element through the uplink address.

In an implementation, the target bearer is an existing bearer in a protocol data unit session to which the data flow belongs;

the processor 703 is configured to:

update configuration information of the existing bearer according to an identifier of the existing bearer included in the second interface message, where the updated configuration information of the existing bearer includes a mapping relationship between the existing bearer and the data flow.

Alternatively, the processor 703 is configured to read the computer program in the memory 701 and perform the following operations:

receiving a first interface message transmitted by a first network element in the radio access network, where the first interface message includes an identifier of a data flow of the downlink user data;

determining a target bearer to which the data flow is mapped according to the first interface message;

transmitting a second interface message to the first network element, where the second interface message includes an identifier of the target bearer, so that the first network element transmits the downlink user data to a user equipment according to the target bearer.

In an implementation, the processor 703 is configured to:

transmit a third interface message to a third network element in the radio access network, where the third interface message is used for instructing the third network element and the user equipment to determine the configuration information of the target bearer and for instructing the third network element to allocate the downlink address of the target bearer;

receive the downlink address transmitted by the third network element and transmit the downlink address to the first network element, to enable the first network element to transmit the downlink user data to the third network element according to the downlink address.

In an implementation, the processor 703 is configured to:

receive an uplink address of the target bearer transmitted by the first network element;

transmit the uplink address to the third network element, to enable the third network element to transmit uplink user data to the first network element through the uplink address.

In an implementation, the target bearer is an existing bearer in a protocol data unit session to which the data flow belongs.

In an implementation, the processor 703 is configured to:

transmit a fourth interface message to a third network element in the radio access network, where the fourth interface message is used for indicating a mapping relationship between the data flow and the target bearer.

In FIG. 7, a bus interface may include any number of interconnecting buses and bridges, specifically linked together by various circuits of one or more processors represented by the processor 703 and a memory represented by the memory 701. The bus interface may also link various other circuits such as peripherals, voltage regulators, power management circuits and the like, which are well known in the art, and therefore, will not be further described in the present disclosure. A bus interface provides an interface. The transceiver 702 may be a plurality of elements including a transmitter and a receiver, for providing a device for communicating with various other apparatuses over a transmission medium. These transmission medium includes a transmission medium such as wireless channels, wired channels, optical cables, etc. The processor 703 is responsible for managing the bus interface and general processing, and the memory 701 can store data used by the processor 703 when performing operations.

In an implementation, the processor 703 may be a central processing module (CPU), a disclosure specific integrated circuit (ASIC), a field-programmable gate array (FPGA), or a complex programmable logic device (CPLD), and the processor may also use a multi-core architecture.

It should be noted that, the foregoing network device provided by the present disclosure can implement all method steps implemented by the first network element or the second network element in the foregoing method embodiments, and can achieve the same effects. The parts and beneficial effects of this embodiment that are the same as those of the method embodiments are not described here again.

The present disclosure also provides a processor-readable storage medium, where the processor-readable storage medium stores a computer program, and when the computer program is executed by a processor, the processor is enabled to perform the method implemented by the first network element or the second network element in the foregoing method embodiments.

The processor-readable storage medium may be any available medium or data storage device that can be accessed by the processor, including but not limited to a magnetic memory (such as a floppy disk, a hard disk, a magnetic tape, a magneto-optical disk (MO), etc.), an optical memory (such as a CD, a DVD, a BD, an HVD, etc.), and a semiconductor memory (such as a ROM, an EPROM, an EEPROM, a non-volatile memory (NAND FLASH), a solid state disk (SSD)), etc.

The present disclosure also provides a computer program product, where the computer program product includes a computer program, and when the computer program is executed by a processor, the processor is enabled to perform the method implemented by the first network element or the second network element in the foregoing method embodiments.

The embodiments of the present disclosure can be provided as a method, a system or a computer program product. Therefore, the present disclosure may adopt the form of an entirely hardware embodiment, an entirely software embodiment or an embodiment combining software and hardware. Furthermore, the present disclosure may adopt the form of a computer program product implemented on one or more computer-usable storage mediums (including but not limited to a disk memory, an optical memory, and the like) containing computer-usable program codes.

The present disclosure is described with reference to the flowcharts and/or block diagrams of the methods, apparatuses and computer program products according to the embodiments of the present disclosure. It should be understood that, each flow and/or block in the flowcharts and/or block diagrams and combinations of flows and/or blocks in the flowcharts and/or block diagrams can be implemented by computer-executable instructions. The computer-executable instructions may be provided to a processor of a general-purpose computer, a special-purpose computer, an embedded processor or other programmable data processing devices to produce a machine, which enables instructions executed by a processor of a computer or other programmable data processing devices to generate an apparatus for implementing functions specified in one or more processes in the flowcharts and/or one or more blocks in the block diagrams.

These processor-executable instructions may also be stored in a processor-readable memory that can direct a computer or other programmable data processing devices to operate in a particular manner, so that the instructions stored in the processor-readable memory generate an article of manufacture including an instruction apparatus. The instruction apparatus implements functions specified in one or more processes in the flowcharts and/or one or more blocks in the block diagrams.

These processor-executable instructions may also be loaded into a computer or other programmable data processing devices, so that a series of operational steps are performed on the computer or other programmable devices to generate computer-implemented processing. Thus, the instructions executed on the computer or other programmable devices provide steps for implementing the functions specified in one or more processes in the flowcharts and/or one or more blocks in the block diagrams.

The invention claimed is:

1. A data processing method, applied to a first network element in a radio access network and comprising:

receiving a downlink data packet, wherein the downlink data packet comprises downlink user data and an identifier of a data flow to which the downlink user data belongs;

transmitting a first interface message to a second network element in the radio access network, wherein the first interface message comprises the identifier of the data flow, and the first interface message is used for determining a target bearer to which the data flow is mapped;

receiving a second interface message transmitted by the second network element, wherein the second interface message comprises an identifier of the target bearer;

determining configuration information of the target bearer according to the identifier of the target bearer comprised in the second interface message, wherein the configuration information of the target bearer comprises a mapping relationship between the target bearer and the data flow;

transmitting the downlink user data to the user equipment based on the mapping relationship.

2. The method according to claim 1, wherein the method further comprises:

judging whether the data flow is mapped to a bearer according to the identifier of the data flow.

3. The method according to claim 2, wherein when the data flow is mapped to the default bearer, the target bearer is a further bearer except the default bearer.

4. The method according to claim 1, wherein transmitting the downlink user data to the user equipment based on the mapping relationship comprises:

acquiring a downlink address of the target bearer from a third network element in the radio access network based on the mapping relationship;

transmitting the downlink user data to the third network element based on the downlink address of the target bearer, to enable the third network element to transmit the downlink user data to the user equipment through the target bearer.

5. The method according to claim 4, wherein the method further comprises:

transmitting an uplink address of the target bearer to the third network element, wherein the uplink address is used for instructing the third network element to transmit uplink user data to the first network element through the uplink address.

6. The method according to claim 1, wherein the target bearer is an existing bearer in a protocol data unit session to which the data flow belongs;

wherein determining the configuration information of the target bearer according to the identifier of the target bearer comprised in the second interface message comprises:

updating configuration information of the existing bearer according to an identifier of the existing bearer comprised in the second interface message, wherein the updated configuration information of the existing bearer comprises a mapping relationship between the existing bearer and the data flow.

7. A data processing method, applied to a second network element in a radio access network and comprising:

receiving a first interface message transmitted by a first network element in the radio access network, wherein the first interface message comprises an identifier of a data flow of downlink user data;

determining a target bearer to which the data flow is mapped according to the first interface message;

transmitting a second interface message to the first network element, wherein the second interface message comprises an identifier of the target bearer;

transmitting a third interface message to a third network element in the radio access network, wherein the third interface message is used for instructing the third network element and the user equipment to determine configuration information of the target bearer and for instructing the third network element to allocate a downlink address of the target bearer;

receiving the downlink address transmitted by the third network element and transmitting the downlink address to the first network element, to enable the first network element to transmit the downlink user data to the third network element according to the downlink address.

8. The method according to claim 7, wherein the method further comprises:

receiving an uplink address of the target bearer transmitted by the first network element;

transmitting the uplink address to the third network element, to enable the third network element to transmit uplink user data to the first network element through the uplink address.

9. A network device, comprising a memory, a transceiver and a processor, wherein:

the memory is configured to store a computer program;

the transceiver is configured to receive and transmit data under control of the processor; and the processor is configured to read the computer program in the memory to:

control the transceiver to receive a downlink data packet, wherein the downlink data packet comprises downlink user data and an identifier of a data flow to which the downlink user data belongs;

control the transceiver to transmit a first interface message to a second network element in a radio access network, wherein the first interface message comprises the identifier of the data flow, and the first interface message is used for determining a target bearer to which the data flow is mapped;

control the transceiver to receive a second interface message transmitted by the second network element, wherein the second interface message comprises an identifier of the target bearer;

determine configuration information of the target bearer according to the identifier of the target bearer comprised in the second interface message, wherein the configuration information of the target bearer comprises a mapping relationship between the target bearer and the data flow;

control the transceiver to transmit the downlink user data to the user equipment based on the mapping relationship.

10. The network device according to claim 9, wherein the processor is configured to read the computer program in the memory to:

judge whether the data flow is mapped to a bearer according to the identifier of the data flow;

control the transceiver to transmit the first interface message to the second network element in the radio access network when the data flow is not mapped to the bearer or the data flow is mapped to a default bearer.

11. A network device, comprising a memory, a transceiver and a processor, wherein:

the memory is configured to store a computer program;

the transceiver is configured to receive and transmit data under control of the processor; and the processor is configured to read the computer program in the memory and perform the method according to claim 7.

12. A non-transitory processor-readable storage medium, wherein the non-transitory processor-readable storage medium stores a computer program, and the computer program is used for enabling a processor to perform the method according to claim 1.

13. A non-transitory processor-readable storage medium, wherein the non-transitory processor-readable storage medium stores a computer program, and the computer program is used for enabling a processor to perform the method according to claim 7.

* * * * *